W. BRYANT.
Subsoil-Plow.
No. 1,527. Patented Mar. 31, 1840.
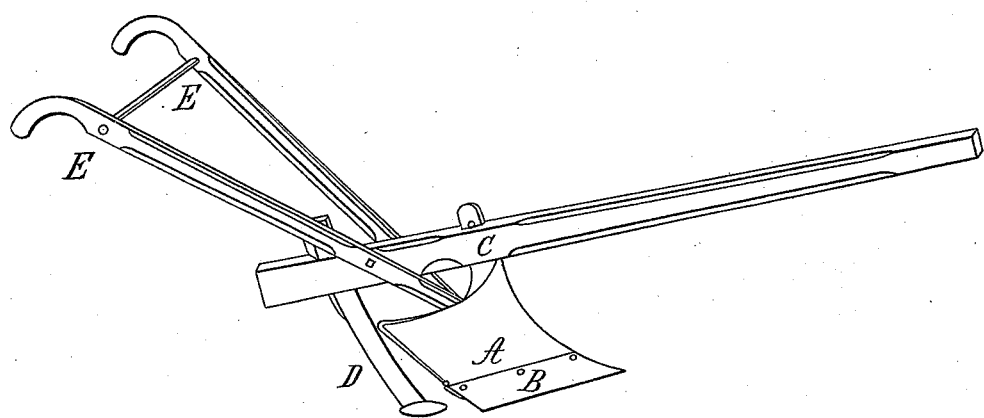

UNITED STATES PATENT OFFICE.

WM. BRYANT, DAVIDSON COUNTY, TENNESSEE.

IMPROVEMENT IN PLOWS.

Specification forming part of Letters Patent No. 1,527, dated March 31, 1840.

*To all whom it may concern:*

Be it known that I, WILLIAM BRYANT, of the county of Davidson and State of Tennessee, have invented a new and useful Improvement in Plows; and I hereby declare that the following is a full and exact description.

The nature of my invention consists in fixing behind the share or cutting part of the plow a colter, so as to run deeper and loosen the ground deeper than it is cut by the share.

To enable others skilled to make and use my invention, I proceed to describe its construction and operation.

I construct the mold-board A of cast-iron and in the common form, to the lower part of which I attach by screws the share or cutting part B, made in the common manner of wrought-iron, with a steel edge. The upper part of the mold-board has a shank, which passes through the beam C, and is fastened to it by a key-bolt.

About twelve inches behind the mold-board I place the colter D in the beam. It can be fixed higher or lower, as desired, and is fastened by a key-wedge. It is made as colters generally are, and placed a few inches lower than the share, with the point projecting a little forward.

The handles E E are attached to the beam by a screw-bolt, and their lower end, being fastened to the mold-board, serves as a brace to it. When the plow is in use the share and mold-board cut and remove the earth as in common plowing, and the colter, passing in the furrow, loosens the earth lower than the share runs.

What I claim as my invention, and desire to secure by Letters Patent, is—

The fixing in the plow a colter behind the share or cutting part, which colter steadies the plow and loosens the earth lower than the share cuts.

WILLIAM BRYANT.

Witnesses:
R. B. TURNER,
JOHN WRIGHT.